United States Patent [19]

Tanner

[11] Patent Number: 5,622,726
[45] Date of Patent: Apr. 22, 1997

[54] APPARATUS FOR THE REPAIR OF WINDSHIELDS

[76] Inventor: Arone Tanner, P.O. Box 68243, Portland, Oreg. 97268

[21] Appl. No.: 533,653

[22] Filed: Sep. 25, 1995

[51] Int. Cl.⁶ .................................................. B32B 35/00
[52] U.S. Cl. ........................ 425/12; 264/36; 425/13; 425/DIG. 33
[58] Field of Search ...................... 425/12, 13, DIG. 33; 264/36; 156/94

[56] References Cited

U.S. PATENT DOCUMENTS

| | | | |
|---|---|---|---|
| 4,032,272 | 6/1977 | Miller | 425/12 |
| 4,280,861 | 7/1981 | Schwartz | 425/13 |
| 4,385,879 | 5/1983 | Wilkinson | 425/12 |
| 4,419,305 | 12/1983 | Matles | 425/13 |
| 4,681,520 | 7/1987 | Birkhauser, III | 425/12 |
| 4,744,841 | 5/1988 | Thomas | 425/13 |
| 4,775,305 | 10/1988 | Alexander et al. | 425/12 |
| 4,776,780 | 10/1988 | Banks | 425/12 |
| 4,826,413 | 5/1989 | Matles | 425/12 |
| 4,921,411 | 5/1990 | Ottenheimer | 425/13 |
| 4,975,037 | 12/1990 | Freiheit | 425/13 |
| 4,995,798 | 2/1991 | Ameter | 425/12 |
| 5,028,223 | 7/1991 | Ameter | 425/13 |
| 5,122,042 | 6/1992 | Einiger | 425/12 |
| 5,234,325 | 8/1993 | Hill | 425/13 |

*Primary Examiner*—Robert Davis
*Attorney, Agent, or Firm*—James D. Givnan, Jr.

[57] ABSTRACT

An appratus including a support structure which carries a positioning device having a valve positionable into contact with a damaged windshield. The valve includes a chamber for a repair liquid and passageways for the liquid and for the removal of air from the windshield damage area. A ball element of the valve is controlled by a hand held magnet and when unseated releases the liquid into a valve outlet defined by an O-ring seal. A hand pump with a lockable piston evacuates the valve and the damage site and subsequently opens to pressurize the site. A positionable mirror provides direct viewing and also a reflected image of the repair operation. A modified support structure permits repairs in curved and marginal areas of the windshield.

11 Claims, 2 Drawing Sheets

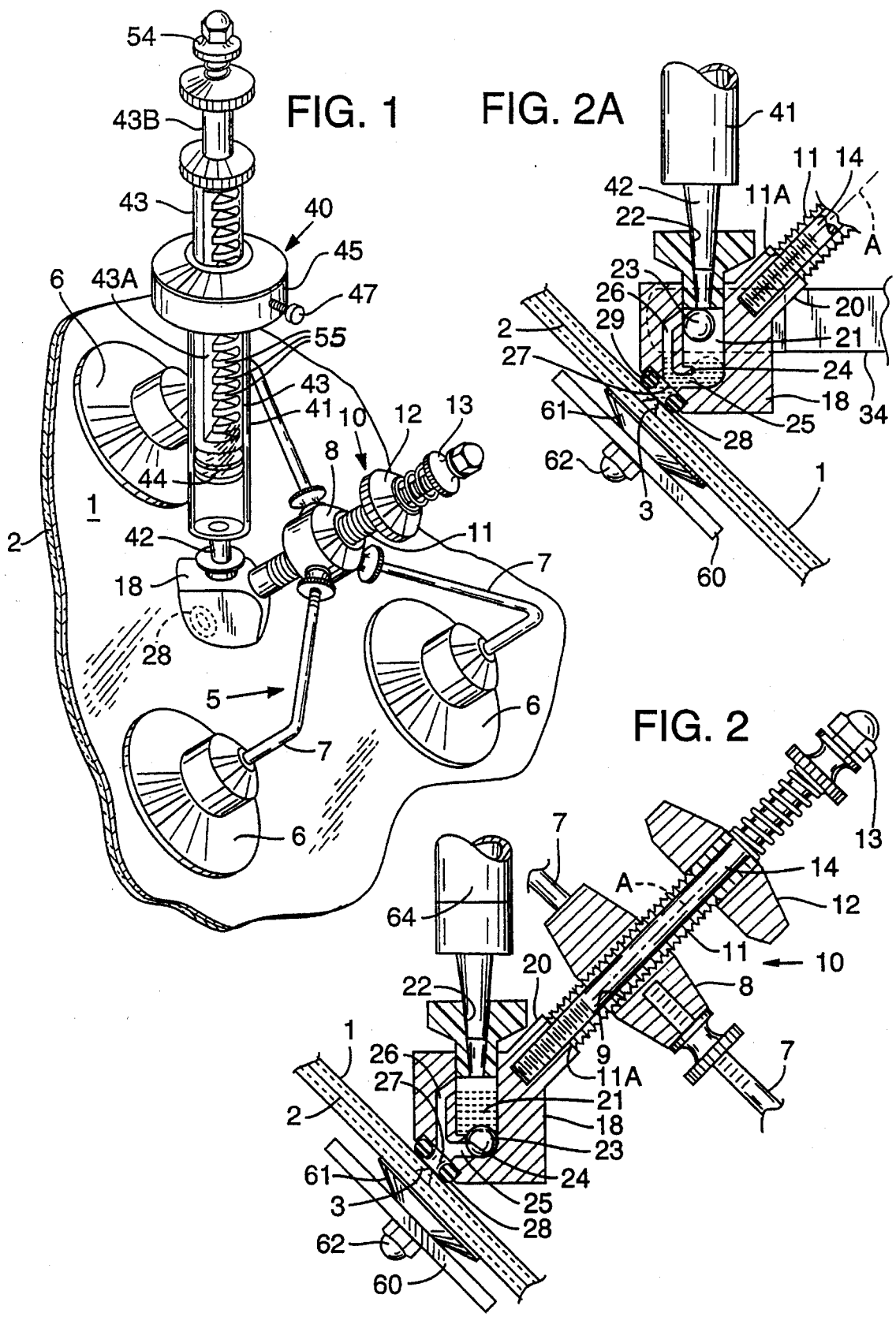

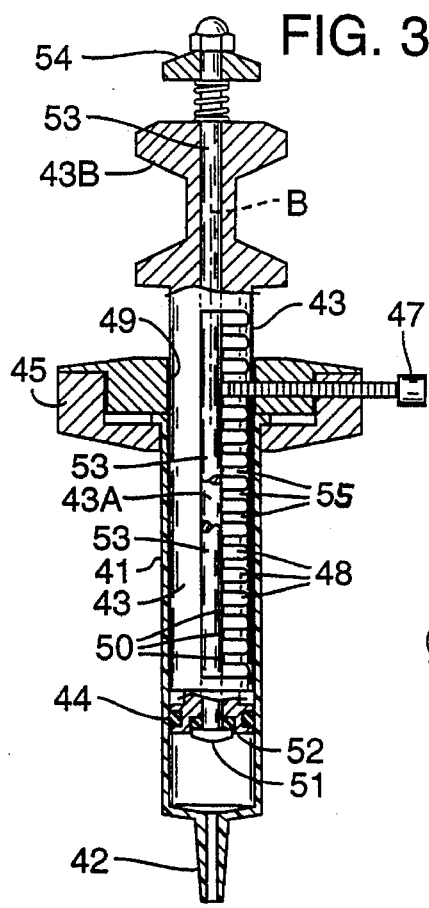
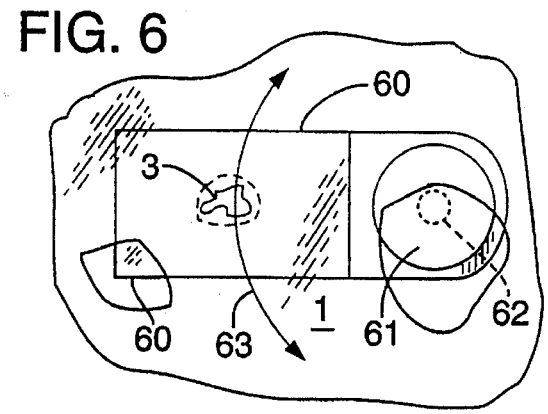
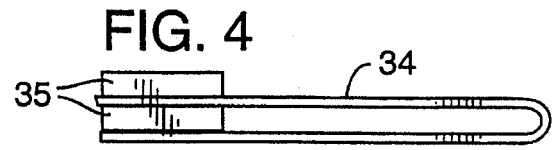
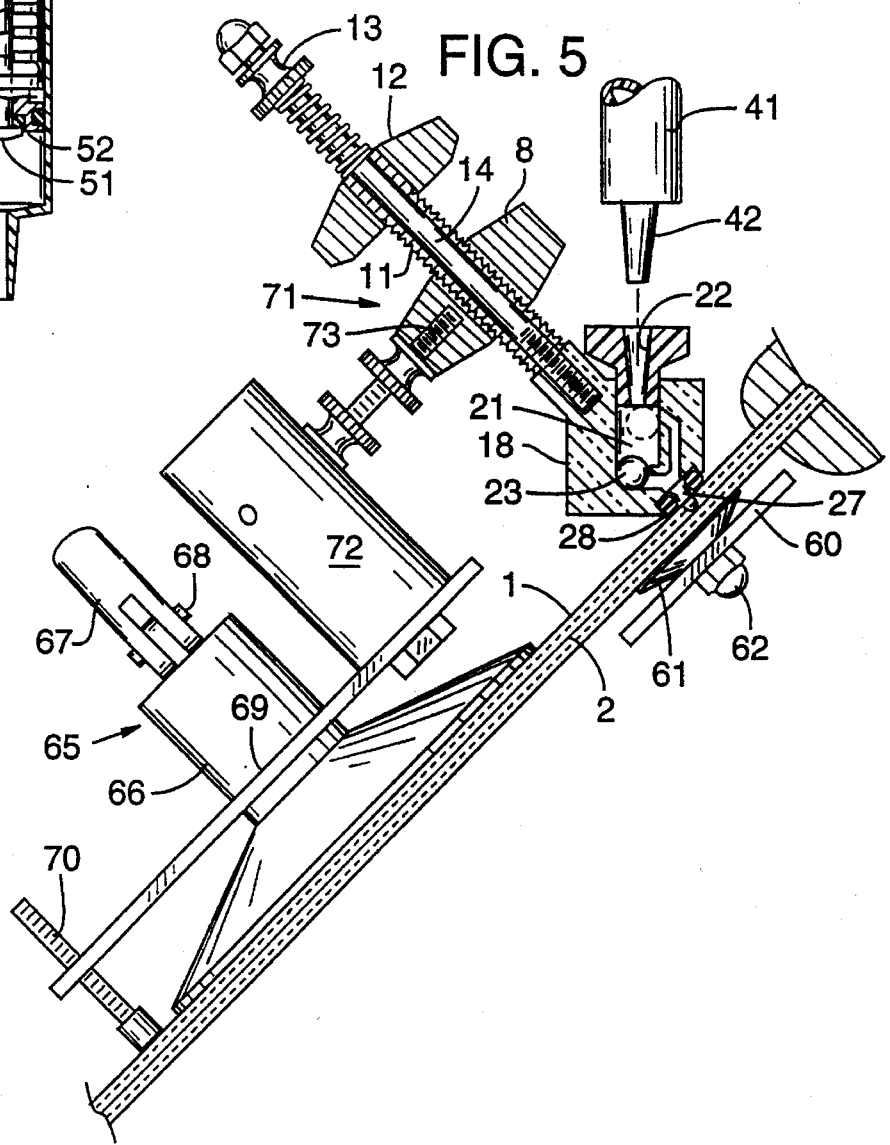

5,622,726

APPARATUS FOR THE REPAIR OF WINDSHIELDS

BACKGROUND OF THE INVENTION

The present invention pertains generally to devices for the repair of damaged windshields.

It is common practice to repair rock marred windshields in place to avoid costly windshield replacement and resulting in substantial savings to the vehicle owner. Such repair efforts typically entail the application of a partial vacuum to the damaged area and the subsequent application of a resin in the evacuated area.

To accomplish the above, a number of repair devices have been proposed. Shortcomings of known devices include the use of internal O-rings, the life of which is reduced by exposure to resinous repair material. Known repair devices often include several cumbersome accessories and tubing which result in time consuming set up and removal and which complicate transport of equipment to the next repair location. Additionally some repair devices utilize powered accessories requiring a nearby power outlet which prevents windshield repair at the curb or in parking lots while still other devices obscure the damaged area of a windshield to prevent close monitoring of the application of a repair liquid.

In the prior art, U.S. Pat. No. 4,032,272 discloses a repair device which obscures the site being repaired and relies on internal O-rings susceptible to early failure upon repeated contact with resins commonly used in windshield repair. U.S. Pat. No. 4,681,520 discloses components for delivery of the repair liquid and the provision of a vacuum at the repair site followed by pressurizing of the site. U.S. Pat. No. 4,776,780 relies on a plunger 22 acting on a repair resin in chamber 45 with a sealing lip 37 confining a repair liquid. A diaphragm 21 tends to obscure the damage site. U.S. Pat. No. 4,775,305 shows a repair device that includes a plunger 60 equipped with an O-ring to expel a repair liquid into an O-ring defined repair site. The tool is inverted to receive repair liquid and then re-inverted and adjusted into contact with a windshield. U.S. Pat. No. 4,826,413 shows a device which also uses an O-ring equipped plunger to confine a repair resin and then discharge same. U.S. Pat. No. 4,995,798 notes the avoidance of an O-ring in the device to maintain vacuum pressure in the lower portion thereof. A plunger is utilized to discharge repair resin through a resilient tip member 20 into an evacuated site. U.S. Pat. No. 5,122,042 shows a tool with a hand operated pump to vacuumize a damage site with resin in place therein and then pressurizing of the site.

SUMMARY OF THE PRESENT INVENTION

The present invention is embodied in an apparatus for the repair of damaged windshields by the application of a repair liquid to the damage site via a magnetic valve for controlling the flow of a repair liquid.

A support structure for placement on a damaged windshield carries adjustable positioning means enabling the magnetic valve and an external O-ring thereon to be brought into sealing contact with the windshield about the damage site. The chamber is provided with a quantity of repair liquid, such as a resin. A hand pump imparts a partial vacuum to a valve chamber and passageways to remove air from the site. The valve is manually controlled with a valve member actuated magnetically to release a quantity of repair liquid. Actuation of a pump carried poppet valve admits atmospheric air into the pump whereafter pump actuation pressurizes the chamber and passageways of the magnetic valve resulting in the repair liquid being urged into the damage site to fully occupy same. The pump includes a lockable piston to retain desired low or elevated pressures at the damage site.

Important objectives include the provision of a windshield repair apparatus which is of a compact, highly portable nature which permits repairs to be accomplished in a rapid manner on vertical and inclined windshields without time consuming set up effort; the provision of a windshield repair apparatus where only a single readily replaceable external seal is subjected to the deteriorating effects of resins used in windshield repair; the provision of a windshield repair apparatus utilizing a valve having an element responsive to a hand held magnet and from which any residual repair resin may be readily removed if necessary; the provision of a valve with a seal for contact with the windshield with multiple passageways of the valve communicating with the damage site to admit a repair liquid to same subsequent to air removal and then pressurization of the repair liquid for a short period of time.

BRIEF DESCRIPTION OF THE DRAWINGS

In the drawings:

FIG. 1 is a perspective view of the present apparatus in place on a damaged windshield;

FIGS. 2 and 2A are fragmentary sectional views of FIG. 1 showing the magnetic valve at different stages of a repair operation;

FIG. 3 is a vertical sectional view of a pump of the present apparatus;

FIG. 4 is a front elevational view of a hand held magnet for valve actuation;

FIG. 5 is an elevational view of modified support structure of the present apparatus; and FIG. 6 is a plan view of a windshield with fragments broken away to show details of a windshield positionable mirror assembly useable with the present apparatus.

DETAILED DESCRIPTION OF THE PREFERRED EMBODIMENTS

With continuing attention to the drawings, the reference numeral 1 indicates the windshield of a vehicle having an inner laminate at 2. A damage area or site is at 3 which commonly results from various airborne articles. Such a site is usually of conical shape with a greater end area adjacent laminate 2. Such defects may be remedied by filling with an adhesive resin well known to those skilled in the present art.

The present apparatus includes a support structure generally at 5 for temporary attachment to the windshield and which, in turn, enables the precise installation of a later described valve in communication with damage area or site 3. Suction cups at 6 support arms at 7 which, in turn, terminate in engagement with a central support member 8 which has a threaded bore 9 within which the following described valve positioning menas is adjustably carried.

The above mentioned positioning means is indicated generally at 10 and includes a threaded shaft 11 with a fingergrip 12 thereon for conveniently advancing and retracting of the shaft disposed normal to the windshield. A lower end 11A of the shaft rotatably abuts a collar 20 on a valve 18. A control at 13 includes a stem 14 which extends lengthwise interiorly of shaft 11 and to the lower end of which is affixed valve collar 20. Valve 18 is accordingly supported for positioning with respect to windshield 1 as well about an axis A perpendicular to the windshield.

Valve 18 defines a chamber 21 served by a port 22. A metal ball element 23 in the chamber seats at 24 to close off the lower end of chamber 21 from a primary passageway 25 while a secondary passageway 26 of lesser diameter extends from an uppermost portion of chamber 21 to an outlet area 27 defined partially by an external O-ring 28 confined within a shoulder 29 of the valve. O-ring 28, upon positioning of valve 18 by the above described positioning means, may be brought into uniform, flush contact with windshield 1 circumposed about a damage site or area at 3 to seal off same from the atmosphere. Port 22 is shown of conical shape to enable an airtight fit with the tapered end of a later described pump.

Chamber 21 is at all times vertical or upwardly inclined when repairing inclined or vertical windshields to ensure the flow of repair liquid to the damage area without use of other accessories.

In FIG. 4 a magnetic valve control is shown at 34 with magnets 35 which are positionable alongside valve 18 so as to act on ball element 23 to lift same from seat 24, at the upstream end of primary passageway 25 and permit a quantity of repair liquid such as a glass repair resin to pass through primary passageway 25 into outlet 27 and secondary passageway 26, the latter by capillary attraction. Valve 18 is preferably formed from an aluminum alloy or other material such as a suitable plastic.

A pump generally at 40 in FIG. 3 permits the formation of a partial vacuum in valve 18 and more particularly damage site 3 to evacuate same and eventually permit unhindered flow of a repair liquid into same.

Pump 40 includes a tubular main body or barrel 41, preferably of a clear plastic material, terminating downwardly in a tapered nose 42 for airtight coupling with port 22 of valve 18. In barrel shaped main body 41 of the pump is a piston 43 fitted at its lower end with an O-ring 44. Pump barrel 41 terminates upwardly in a circular head portion 45 which is grasped during pump operation and which carries a radially disposed pin 47 projecting inwardly into a central opening 49. During piston travel the inner end of pin 47 rides in a lengthwise extending slot 43A in piston 43 with one side of the slot defined by aligned edges 50 of a series of ribs 55. Rotational movement of piston 43 about a lengthwise axis B of the pump results in pin 47 being received in an opening 48 intermediate a pair of ribs 55 to lock the piston in place. Manipulation of piston 43 is facilitated by the provision of a grip 43B thereon. Accordingly the piston may be drawn in an outward direction and then partially rotated to lock piston 43 in a vacuum inducing position or, alternatively, pushed into barrel 41, and locked by rotation, to a pressurizing position. For terminating vacuum and pressurizing conditions of valve 18 pump 40 is provided with a poppet valve 51 normally seated on an O-ring housed in the inner or lower end of piston 43. A control stem or shaft 53 acts to position poppet valve 51 away from seat 52 upon actuation of a control 54 and stem 53 extending lengthwise along and concentric with piston 43. Accordingly hand operated pump 40 and piston 43 may be locked in a raised, vacuum generating position or a lower, pressurizing position by the seating of pin 47 in one of the rib defined slots 48 upon partial rotation of the piston with the pump interior subsequently returned to atmospheric pressure upon opening of valve 51 by finger tip actuation of control 54.

In operation support structure 10 is installed on the windshield in a manner positioning seal 28 of valve 18 about the damaged area. Threaded shaft 11 is advanced to ensure lightly biased contact of the seal with the windshield. For this purpose it is helpful to attach a mirror 60 to the inner side of the windshield to conveniently monitor repair operation. Such a mirror is attached by a suction cup 61 carried by a fastener assembly 62 which permits displacement of the mirror about the axis of the fastener assembly per arrow 63 to permit momentary direct viewing of the repair underway from the interior of the vehicle.

An amount of repair liquid is discharged into valve 18 through port 22 from a container at 64 per FIG. 2. Upon removal of container 64, the tapered outlet 42 of pump 40 is inserted into valve port 22 and the piston drawn outwardly to impart subatmospheric pressure to the valve interior and damage site 3 for air removal. With pump piston locked in a raised or vacuumizing position, valve 18 is magnetically actuated permitting a flow of repair liquid to outlet area 27 defined by O-ring 28. Upon magnet removal seating of ball element 23 occurs whereupon some liquid moves into secondary passageway 26 and pump 40 is again operated to subject valve 18 and the repair liquid therein to further pressure reductions to ensure evacuation of any air up through the repair liquid. Pump 40 is subsequently vented to the atmosphere by unseating of poppet valve 51 whereafter repair liquid flows into damage area 3. With valve 51 seated, the pump is pressurized by inward movement of pump piston 43 expelling repair liquid from passageway 26, as needed, and the piston locked in a pressurizing position in the manner above explained, and left for a few mintues to ensure complete filling of damage area 3. A quantity of repair liquid may remain in the valve by capillary attraction and/or surface tension for additional repairs.

During application of reduced pressure to valve 18 in the above described operation, purging of valve 18, damage site 3 and and the repair liquid is enhanced by the shifting of ball element 23 between open and closed positions with magnet 34. Such movement of the ball element additionally propels repair liquid into secondary passageway 26 whereat it will remain until pressurizing of the valve takes place.

In FIG. 5 a modified support structure is indicated generally at 65 and which enables use of the present apparatus on windshield corners and edges. A single suction cup assembly at 66 is of the type having a cam lever 67 rockable about a pin 68 to actuate the suction cup. A platform 69 is stabilized by a foot 70 while positioning means, generally at 71, is carried by a post 72 on the platform. Central support member 8 is drilled and tapped at 73 for secure threaded attachment to the post.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

1. An apparatus for the repair of a damage area of a windshield including, a support structure attachable to the windshield, a valve including a port and a chamber for reception of a repair liquid and a seal defining an outlet for contact with the windshield about the damage area, positioning means carried by said support structure and coupled to the valve for advancing said seal into contact with the windshield, means for providing the valve chamber with a repair liquid, a pump for communication with said valve via said port to vacuumize the damage area of the windshield, said valve including an internal movable body for controlling the flow of repair liquid from said chamber to said outlet of the valve and the damage area of the windshield, and magnetic means for acting on said movable body to actuate said valve.

2. The apparatus claimed in claim 1 wherein said magnetic means is a hand held magnet.

3. The apparatus claimed in claim 1 wherein said valve additionally includes multiple passageways in communication with the outlet defined by said seal.

4. The apparatus claimed in claim 3 wherein said passageways include a primary passageway and a secondary passageway, said primary passageway in direct communication with said chamber when said valve is actuated.

5. The apparatus claimed in claim 1 wherein said internal movable body in said valve is a ball element normally seated to block the flow of repair liquid from the valve chamber, said valve including a primary passageway directing repair liquid to said outlet and a secondary passageway in open communication with said chamber and said outlet.

6. The apparatus claimed in claim 1 wherein said pump includes a piston having a series of spaced apart ribs defining openings there between and an axially extending slot in communication with said openings, a pump barrel, a pin carried by said barrel, said piston lockable to said barrel upon rotation of the piston to receive said pin in one of said openings to maintain the pump barrel and the valve chamber below or above ambient air pressure.

7. The apparatus claimed in claim 6 wherein said piston includes a poppet valve for venting the pump barrel and said valve.

8. The apapratus claimed in claim 7 wherein said poppet valve includes a control at a remaining end of said piston.

9. The apparatus claimed in claim 1 additionally including a mirror assembly for monitoring the windshield repair, said mirror assembly including a suction cup and a fastener assembly coupling the mirror to the suction cup, said fastener assembly permitting positioning of the mirror arcuately about said fastener assembly to permit direct viewing of the damage site being repaired.

10. The apparatus claimed in claim 1 wherein said support structure includes a single suction cup assembly including a lever actuated linkage to actuate and release a suction cup.

11. The apparatus claimed in claim 1 wherein said positioning means locates said valve along a first axis, said pump having a lengthwise axis, said first axis and said lengthwise axis lying in intersecting planes defining an acute included angle.

* * * * *